United States Patent [19]
Pearce, Jr.

[11] Patent Number: 5,099,794
[45] Date of Patent: Mar. 31, 1992

[54] HOUSE FOR PET CATS

[76] Inventor: Clarence W. Pearce, Jr., 124 Lake Shore Dr., Apt. 230, North Palm Beach, Fla. 33408

[21] Appl. No.: 692,940

[22] Filed: Apr. 29, 1991

[51] Int. Cl.⁵ .............................................. A01K 1/03
[52] U.S. Cl. ....................................................... 119/19
[58] Field of Search ...................... 119/15, 19, 23, 165, 119/166, 167, 168, 169, 170; D30/108, 109, 110, 111, 112

[56] References Cited

U.S. PATENT DOCUMENTS

| | | | |
|---|---|---|---|
| 1,455,105 | 5/1923 | Butcher | 119/19 |
| 2,410,221 | 10/1946 | Latura | 119/19 |
| 4,029,048 | 6/1977 | Gershbein | 119/165 |
| 4,177,761 | 12/1979 | Bellocchi, Jr. | 119/19 |
| 4,347,807 | 9/1982 | Reich | 119/19 |
| 4,391,223 | 7/1983 | Holland et al. | 119/19 |
| 4,793,286 | 12/1988 | Buxton | 119/19 |
| 4,803,952 | 2/1989 | Houser | 119/19 |

*Primary Examiner*—Gene Mancene
*Assistant Examiner*—R. Thomas Price
*Attorney, Agent, or Firm*—Harry W. Barron

[57] ABSTRACT

A one or two story housing unit for a cat includes an enclosure having a roof portion, three solid walls and one port wall containing an opening through which a cat can enter the enclosure. Extending from the port wall is an open top porch area substantially surrounded by a vertical wall over which the cat can step and lie down in the porch or enter the enclosure. In the one story embodiment, the port wall opening is spaced from the bottom of the port wall and that portion of the port wall below the opening forms a portion of the porch enclosure. In the two story embodiment, a horizontal panel is positioned in the enclosure and the port wall extends from the horizontal panel upward to the roof.

12 Claims, 2 Drawing Sheets

HOUSE FOR PET CATS

BACKGROUND OF THE INVENTION

1. Field Of The Invention

The present invention relates generally to the field of miniature houses and play areas for pets, and more particularly, to a house for a pet cat having a dark enclosed portion with an entrance opening from an adjoining porch area, the porch area being bordered by vertical walls to resemble an open box for attracting the cat.

2. Background Information

Anyone who has ever observed a pet cat quickly observes that the cat has several hiding or resting places. Among the more common hiding or resting places are inside paper bags and cardboard boxes. Particularly desirable, from the cat's point of view, are long narrow boxes in which only a side opening exists. However, even a simple box, such as a carton used to contain twenty-four conventional soda or beer cans, becomes a play or rest area for the typical cat. On the other hand, if a mat, mattress, or other non-walled structure is laid out for a cat, the average cat will ignore that element, preferring a corner, box or other enclosed area.

There have long been miniature houses for animals, including cats. These houses often have been designed to charm and entertain the cat owner with their external similarity to human houses. While designing a cat house to charm the owner is important from a commercial view, since it is the owner who is spending the money to purchase the house, the cats are frequently reluctant to use the house. This reluctance may result from a lack of privacy or containment or a lack of a definable territory. Cat owners often find, to their dismay, that the cat prefers an open-topped cardboard box to the store bought expensive house. It has been found that if an enclosed house has a fully enclosed front porch area added thereto, which porch resembles an open top box, cats are attracted to use and enjoy the house to a much greater extent than they used a similar house without such a porch.

3. Description of the Prior Art

Most pet houses for cats described in the prior art consist of enclosures with closed tops and one or more side entrance ports. An example is the two story cat condominium of Houser, U.S. Pat. No. 4,803,952, issued on Feb. 14, 1989. The Houser structure includes feeding, sleeping and rest room features, and is disposable. A problem with Houser is that it is simply a typical closed structure which cats are reluctant to enter. While a porch area is provided on the second story portion of Houser, the porch has no side walls which might give it the appeal or appearance of a open cardboard box. Thus, despite the appeal to the cat owner, the Houser structure will remain unused by the cat.

Binkert, U.S. Pat. No. 4,576,116, issued on Mar. 18, 1986, discloses a collapsible tent like structure having two walls leaning together to form a peak. The walls are connected at their upper edges by hinges and at their lower edges by a sheet of fabric. The walls swing together on the hinges while the sheet folds, for compact storage. Carpet is provided on the walls to permit the walls to double as a scratching surface. In apparent recognition that a cat may not wish to enter such a structure, toys are suspended within the open ends. If the cat must be bribed into entering the house, a failure in the design is indicated.

Buxton, U.S. Pat. No. 4,793,286, issued on Dec. 27, 1988, discloses a collapsible house for a domestic animal. It is formed of a skeletal frame covered with fabric and includes a porch area provided in communication with an enclosed section. The porch area has an open side and a covered roof to shield the interior from the elements, and thus, is nothing more than an extension of the house itself. The inclusion of the porch area in Buxton does nothing to attract the animal to enter the structure. In fact, because the porch has a covered roof, it is like a tunnel and makes the interior of the enclosed section seem more confining.

An animal housing unit which is essentially a stylized bucket placed on its side is disclosed in Cockrell, U.S. Pat. No. 3,496,912, issued on Feb. 24, 1970. A front panel with an entrance port snaps into a groove in the open end of the housing member. The chief advantage of Cockrell is that removal of the front panel permits housing members to fit one inside the other for compact storage. Again, while a feature is provided which may appeal to the human owner, no provision is made to attract a cat to use the house.

Bellocchi, U.S. Pat. No. 4,177,761, issued on Dec. 11, 1979, teaches a pet house which is a box having an open side and a hole in the top. A peg projects vertically from the top and supports a toy suspended from a string. The animal can reach through the hole to play with the toy. The top can be slid along tracks and removed so that the owner can clean the house and gain access to the animal. Bellocchi, however, is not sufficiently open to have the appeal of an open box, and not sufficiently closed to offer the privacy or territorial definition and other benefits of a full enclosure.

Reich, U.S. Pat. No. 4,347,807, issued on Sept. 7, 1982, teaches a multi-level cat condominium. The floors are shelves which can be removed and the enclosure folded flat for storage. Carpet is attached to the exterior for the cat to scratch. Although Reich provides multiple levels, each level is still a fully enclosed cavity with a single entrance port. No inducement is offered to attract the cat to enter any of them.

Other pet houses in the prior art share the same characteristics and disadvantages. These disclose miniature house structures with roofs and side entrances, and include Latura, U.S. Pat. No. 2,410,221, issued on Oct. 29, 1946; Allen, U.S. Pat. No. 1,754,590, issued on Apr. 15, 1930; Mathis, U.S. Pat. No. 3,866,577, issued on Feb. 18, 1975 and Holland, U.S. Pat. No. 4,391,223, issued on July 5, 1983. All are confining, isolating enclosures with no provision for attracting cats to enter. Thus, despite their visual appeal and apparent advantages to the owner, they may go unused.

What is needed is a house adapted particularly for a pet house cat with structural features to accommodate the natural preferences and needs of cats, while at the same time appealing to the human preferences of the cat's owner. One attractive structural form known to be preferred by cats is the open topped box, particularly a box with low sides, similar to the cardboard boxes used to contain twenty-four aluminum cans. Incorporating this kind of enclosure element into the entrance area of a pet cat's house attracts the cat to use and enjoy the house. Another structure known to be preferred by cats is the enclosed box with a relatively small side opening and incorporation of this element would additionally add a useful function to the cat's house. By combining these two elements, the cat can choose between two structures it likes and alternatively use one or the other as the cat's mood changes.

SUMMARY OF THE INVENTION

In accordance with one aspect of this invention, there is provided a housing unit for a cat including an enclosure having at least one port through which a cat can enter and a porch area adjacent to the enclosure. The porch area is substantially surrounded by a wall and has an open top and the porch area is sized so that a cat can step therein and lie thereon.

BRIEF DESCRIPTION OF THE DRAWINGS

One preferred embodiment of the subject invention is hereinafter described, with specific reference being made to the following Figures, in which.

DESCRIPTION OF THE PREFERRED EMBODIMENTS

Figure 1:
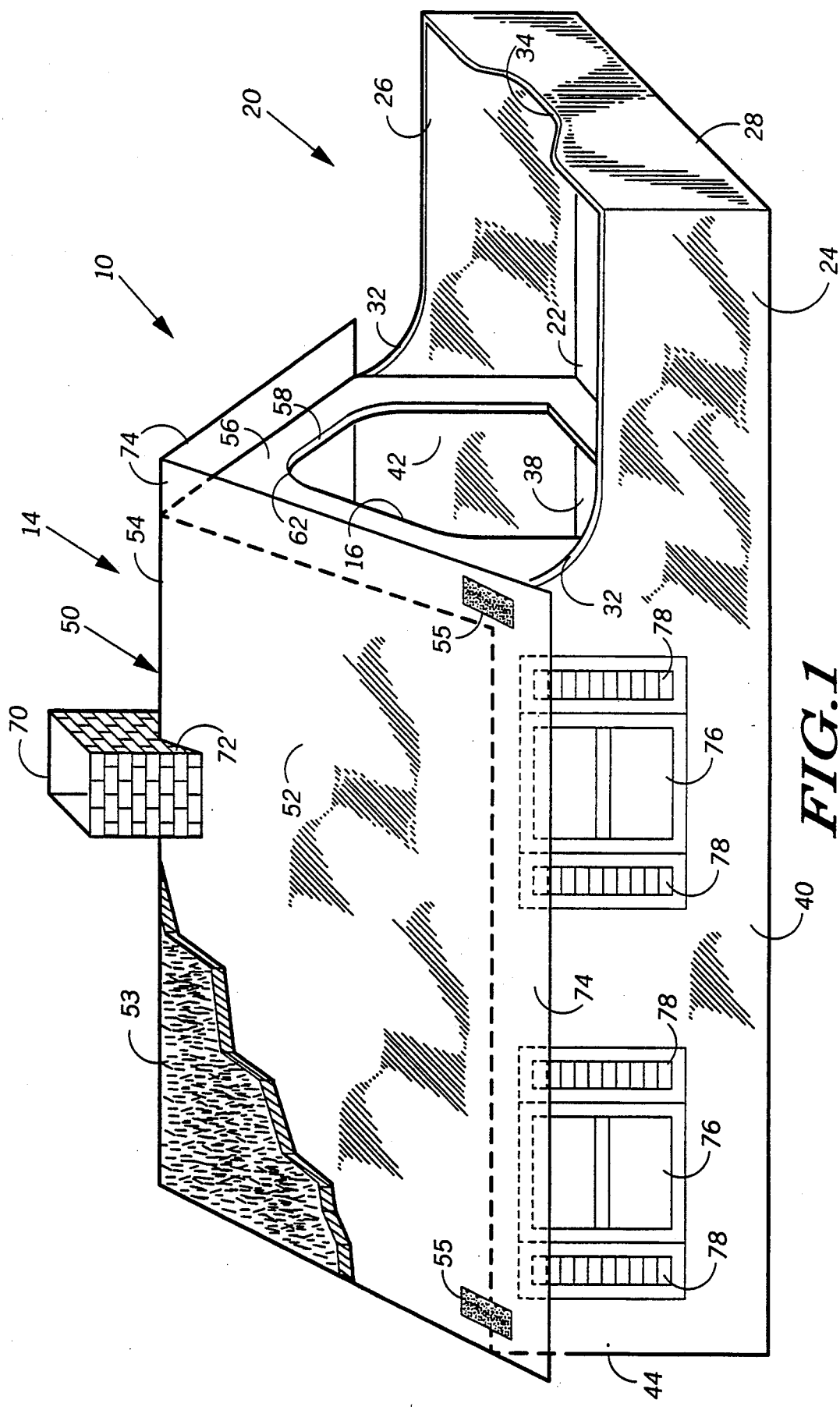
FIG. 1 shows a perspective view of the single story embodiment of the inventive cat house.

Referring now to the drawings, and in particular to FIG. 1, a single story miniature house 10 for a cat is illustrated. House 10 has an enclosed section 14 with an entrance port 16 and a porch section 20 extending outward from entrance port 16. House 10 is preferably constructed of plywood, although plastic sheeting or other sheeting material may be used.

Porch section 20 has a rectangular floor 22, opposing parallel walls 24 and 26 and a perpendicular connecting wall 28. Walls 24, 26 and 28 are short enough for an average cat to step over them; they may be, for example, sufficiently high to extend above a cat when the cat lies within them. The area of floor 24 should be sufficient to permit a cat to lie thereon, and not much greater in order to minimize the size of house 10 and to assure that the fit of a cat within porch section 20 is pleasantly snug for the cat. For example, six inches is an acceptable height for walls 24, 26 and 28. Walls 24, 26 and 28 may be decorated, by painting for example, to resemble a picket fence. The top edges of walls 24 and 26 may be curved upward, as seen at 32, where they meet enclosed section 14. In fact, walls 24 and 26 may be formed from a common and sheet and be integral with one another. The top edge of wall 28 may contain a slight recess 34 of about one inch in approximately its middle third in order to provide a lower segment over which a cat can more easily step.

Enclosed section 14 preferably has a rectangular floor portion 38 which is unitary and continuous with rectangular floor 22. Floor 38 is bordered by two vertical side walls 40 and 42 and vertical end walls 44 and 46. Entrance port 16 is cut into end wall 46 at a position somewhat above floor 38. An inverted V-shaped roof 50, formed of two planar members 52 joined at peak 54, is provided on top of walls 40, 42, 44 and 46. The inverted V-shape of roof 50 requires that end walls 44 and 46 have gables 56 at their upper ends to fit within roof 50. Entrance port 16 has a peaked upper portion 58 which follows the line of roof 50 for aesthetic appeal. The corners 62 of entrance port 16 are rounded to improve appearance.

Porch section 20 has the effective structure of an open low box, which is known to appeal to cats. Enclosed section 14 has the effective structure of a elongated side open box, also known to appeal to cats. Thus, house 10 is designed to permit a cat to curl up in porch section 20 or enclosed section 14. In particular, the porch section 14 will initially appeal to the cat and once the cat becomes accustomed to house 10 in this way, it is more likely to enter and use enclosed section 14. Finally, once the cat becomes accustomed to house 10, it will us it as a play area and jump in and out of porch section 20 and between porch section 20 and enclosed section 14.

Planar members 52 are preferably covered with carpeting 53 to create a surface for a cat to scratch. Carpeting 53 may be secured over roof members 52 using strips 55 of a conventional hook and loop material, such as Velcro. A chimney 70 may be provided in the middle of peak 54 for appearance and to hold carpet 53 in place. To further enhance the appearance of enclosed section 14, planar members 52 extend to form overhanging portions 74. Representations of windows 76 and shutters 78 may be painted onto the outer surfaces of walls 40, 42 and 44. Alternatively, these features may be embossed into the wall material to make them more convincing. However, it has been found that the walls 40, 42 and 44 should be left solid, that is, with no physical openings for the windows 76, in order for the cat to be enticed to enter and remain in the secluded enclosed section 14. Additional aesthetic features may include bricks or horizontal slats painted over the remainder of walls 40, 42, 44 and 46 and the exterior of chimney 70. These aesthetic additions make house 10 a small-scale likeness of an actual house and are provided more for the benefit of the cat's owner than the cat.

Figure 2:
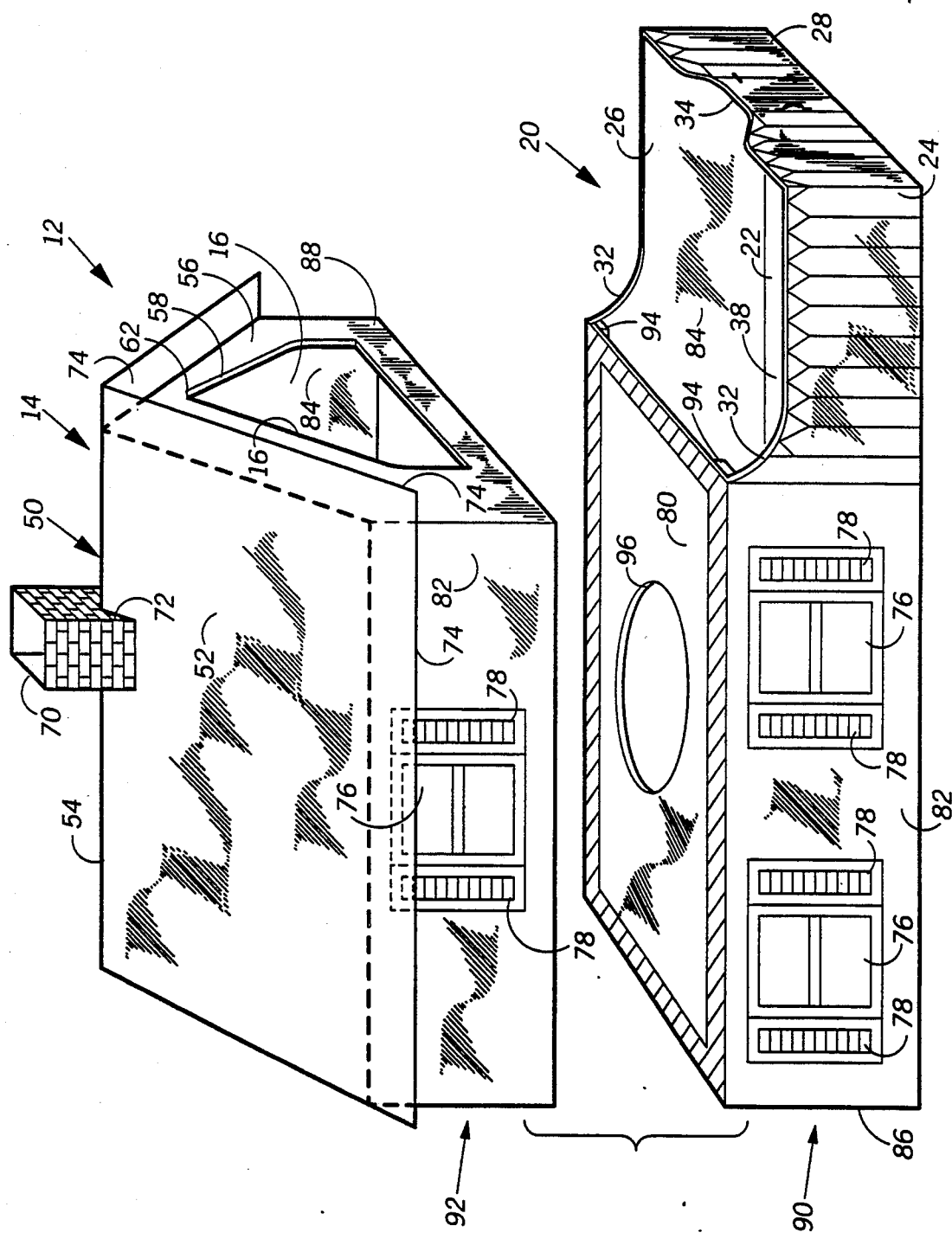
FIG. 2 shows a split, perspective view of the two story embodiment of the inventive cat house.

A two-story version of the invention is shown in FIG. 2 as house 12, which is shown with the first and second stories as being separated in order to better see the structural features, although in practice, they are integral. Where like elements are present in both FIGS. 1 and 2, like numerical designations are used. A horizontal panel 80 divides the interior of enclosed section 14 into a lower compartment 90 and an upper compartment 92. Walls 82, 84, 86 and 88 are sufficiently tall so that compartments 90 and 92 can each comfortably contain a cat. For example, lower compartment 90 may have a height of ten inches and upper compartment 92 may have a height of eight inches to the roof 50 line.

Panel 80 may be supported by brace members 94 affixed to walls 82 and 84 and has sufficient thickness to support a cat positioned thereon. Panel 80 serves as the ceiling of lower compartment 90 and the floor of upper compartment 92. A hole 96 is provided in the middle of panel 80 so that a cat can pass through it when going from one compartment to the other. Wall 88 is similar to wall 46 in FIG. 1 and contains and entrance port 16, which extends only from roof 50 down to slightly above panel 80. It should be noted that no vertical wall separates porch section 20 from lower compartment 90. Representations of second story windows 76 and shutters 78, additional to those first story windows and shutters of FIG. 1, are painted on walls 82, 84 and 86 to enhance the appearance of the two story house 12.

In two story house 12, the lower compartment 90, particularly, will appeal to the cat as does a low open sided box of the type which commonly attract cats. Once within lower compartment 90, the cat's natural curiosity will entice it to move through hole 96 to explore the second story. Also, the cat will jump directly to and from the second story through entrance port 16.

In using either house 10 shown in FIG. 1, or house 12, shown in FIG. 2, a cat will first be attracted to the porch section 22 due to the open top box like configuration thereof. Once inside the porch section 22, the cat's natural instinct to explore will cause it to begin using and playing in the enclosure 14 of the single story house 10 or compartments 90 and 92 of the two story house 12. Once the house 10 or 12 is familiar to the cat, it will thereafter use and enjoy the house 10 or 12. While the particular ornamentation on houses 10 or 12 are more for the benefit of the cat's owner, the overall structure of either house 10 or 12 is designed to attract and please the cat.

What is claimed is:

1. A housing unit for a cat comprising:
   an enclosure having at least one port through which a cat can enter; and
   a porch area adjacent to said enclosure, said porch area being substantially surrounded by a wall and having an open top, said porch area being sized so that a cat can step therein and lie thereon;
   wherein said enclosure includes:
   a rectangular base panel;
   three vertical wall panels bordering said base panel;
   a horizontal separating panel dividing the interior of said enclosure into an upper and a lower level, said three wall panels having sufficient height so that each level comfortably contains an average size pet cat;
   a fourth vertical wall panel positioned above said separating panel and containing said port;
   a roof above said four wall panels; and
   a second port positioned in said horizontal separating panel through which the cat can move from one level to the other.

2. A housing unit according to claim 1:
   wherein said roof portion includes two rectangular panels joined together at one edge in a peaked configuration having an inverted V-shaped cross-section; and
   wherein two of said vertical walls each have a gabled top end to conform to the inverted V-shape of said roof.

3. A housing unit according to claim 1 additionally including a material attached to at least one of the two joined rectangular panels which acts as a scratch pad for said cat.

4. A housing unit according to claim 1 wherein said porch area includes said rectangular base panel, three additional and essentially vertical wall panels bordering and substantially enclosing said base panel on the sides thereof remote from said port.

5. A housing unit according to claim 4, wherein one of said additional wall panels of said porch area has a portion cut out of its top edge to create a lower profile over which the cat can step.

6. A housing unit according to claim 1 wherein said porch area is an extension of said lower level and said fourth wall panel is between said horizontal panel and said roof.

7. A housing unit according to claim 6 additionally including pigments on the outer surfaces of the enclosure to represent at least one window.

8. A housing unit according to claim 1 additionally including pigments on the outer surfaces of the enclosure to represent at least one window.

9. A house and play area for a pet house cat comprising:
   a rectangular base;
   a back wall, a front wall and two side walls extending upward from said base;
   a horizontal panel with an opening between said side walls and said back wall forming upper and lower enclosed volumes;
   a roof affixed to said back wall and a portion of said side walls having said upper enclosed volume therebeneath, the remaining portion of said side walls and said front wall forming an open top enclosed porch for said cat; and
   a port wall extending between said side walls and downward from said roof to said horizontal panel, said port wall having an opening therein sized to permit said cat to ingress and egress said enclosed upper volume.

10. The house and play area according to claim 9 wherein said enclosed volume and said porch area are each of sufficient size to permit a normal pet house cat to lie down therein.

11. The house and play area according to claim 9 wherein said horizontal panel includes an opening therein of sufficient size to per permit a normal pet house cat to ingress and egress between said upper and lower enclosed volumes.

12. The house and play area according to claim 9 wherein said lower and upper enclosed volumes and said porch area are each of sufficient size to permit a normal pet house cat to lie down therein.

* * * * *